US006731909B2

(12) United States Patent
McLain et al.

(10) Patent No.: US 6,731,909 B2
(45) Date of Patent: May 4, 2004

(54) METHOD AND APPARATUS USING A BINARY SEARCH PATTERN FOR IDENTIFYING AN INTERFERING MOBILE TERMINAL

(75) Inventors: Christopher John McLain, Seattle, WA (US); Melvin Barmat, Washington, DC (US)

(73) Assignee: The Boeing Company, Chicago, IL (US)

( * ) Notice: Subject to any disclaimer, the term of this patent is extended or adjusted under 35 U.S.C. 154(b) by 176 days.

(21) Appl. No.: 10/008,199

(22) Filed: Dec. 6, 2001

(65) Prior Publication Data

US 2002/0145562 A1 Oct. 10, 2002

Related U.S. Application Data

(60) Provisional application No. 60/281,460, filed on Apr. 4, 2001.

(51) Int. Cl.$^7$ .............................. H04B 17/00; H04Q 7/20
(52) U.S. Cl. .................. 455/67.13; 455/67.11; 455/67.15; 455/423; 455/424; 455/427
(58) Field of Search ...................... 455/67.11, 67.13, 455/67.15, 423, 424, 12.1, 13.1, 427

(56) References Cited

U.S. PATENT DOCUMENTS

| 5,463,656 | A | 10/1995 | Polivka et al. |
| 5,822,429 | A | 10/1998 | Casabona et al. |
| 5,930,680 | A | 7/1999 | Lusignan |
| 6,075,969 | A | 6/2000 | Lusignan |
| 6,091,936 | A | 7/2000 | Chennakeshu et al. |
| 6,107,960 | A | 8/2000 | Krasner |
| 6,151,308 | A | 11/2000 | Ibanez-Meier et al. |
| 6,272,679 | B1 | 8/2001 | Norin |
| 6,330,462 | B1 | 12/2001 | Chen |

FOREIGN PATENT DOCUMENTS

| EP | 1 052 790 A1 | 11/2000 |
| EP | 1 091 506 A3 | 4/2001 |
| EP | 1 091 506 A2 | 4/2001 |

*Primary Examiner*—Charles Appiah
*Assistant Examiner*—Eugene Yun
(74) *Attorney, Agent, or Firm*—Harness Dickey & Pierce P.L.C.

(57) ABSTRACT

A method for rapidly identifying which one of a plurality of mobile radio frequency (RF) terminals on-board a corresponding plurality of mobile platforms, such as aircraft, accessing a target transponded satellite, is causing interference with one or more non-target satellites orbiting in proximity to the target satellite. The method involves dividing the plurality of mobile RF terminals into two groups and commanding one group of terminals to stop transmitting. A check is then made to determine which group of terminals is causing the interference. That particular group is then subdivided successively by a factor of 2 and alternately checked to see if it is still causing the interference until a single mobile terminal is identified as the source of the interference. This binary technique of successively subdividing all of the terminals into smaller and smaller subpluralities allows the terminal which is causing the interference to be quickly identified from a large plurality of terminals accessing the target transponded satellite.

6 Claims, 3 Drawing Sheets

METHOD AND APPARATUS USING A BINARY SEARCH PATTERN FOR IDENTIFYING AN INTERFERING MOBILE TERMINAL

CROSS REFERENCE TO RELATED APPLICATIONS

This application claims priority from provisional application Ser. No. 60/281,460, filed Apr. 4, 2001.

TECHNICAL FIELD

The present invention relates to mobile RF terminals required to conduct bi-directional communications with a base station via a satellite link, and more particularly to a method and apparatus for identifying which one of a plurality of mobile terminals is causing interference with one or more satellites adjacent a target satellite through the use of a binary search scheme.

BACKGROUND OF THE INVENTION

With mobile RF terminals located on mobile platforms such as aircraft, cruise ships and other moving platforms, communicating with a ground station via a transponded satellite, there is always the remote possibility, in spite of the safeguards that may be built into the mobile terminal, that the terminal may fail in an unanticipated manner. In such event, there is the possibility that the mobile terminal may cause interference with other satellites orbiting in the geo arc adjacent to the target satellite with which the mobile terminal is communicating.

It is also recognized that Fixed Services Satellite (FSS) operators may have difficulty in locating interference from VSAT (Very Small Aperture Terminal) systems that consist of thousands of unsophisticated terminals at remote sites.

Therefore, there exists a need for a ground station in communication with a plurality of mobile terminals via a transponded target satellite to be able to quickly identify a malfunctioning mobile terminal which is causing interference with non-target satellites from among a plurality of mobile terminals accessing the target satellite and to quickly resolve the interference incident.

SUMMARY OF THE INVENTION

The present invention is directed to a system and method for identifying an interfering mobile RF terminal from one of a plurality of mobile RF terminals. The method involves using a base station, such as a ground station having a network operations center (NOC), to analyze signals transmitted by the mobile terminals to the ground station via a transponded target satellite.

A binary search scheme is employed to quickly check designated groups of mobile terminals to determine if the interfering signal is being caused by one of the terminals in a group. The plurality of mobile terminals accessing the target satellite is first divided in a subplurality of two groups. The NOC then commands one of the subpluralities to stop transmitting momentarily to determine if the interference has abated. If not, the NOC performs the same operation with the other subpluralities to determine which subplurality of mobile terminals is causing the interference. Once that group (i.e., subplurality) is identified, the NOC again divides the mobile terminals of that subplurality into two further subpluralities. One of these two subpluralities of mobile terminals are then commanded to stop transmitting momentarily so that the NOC can identify if the interference has abated. This process is repeated using successively smaller and smaller subpluralities of mobile terminals until the NOC identifies the specific mobile terminal that is causing the interference. It will be appreciated that this process is preferably carried out by the NOC communicating with the operator of the non-target satellite so that the NOC can quickly verify if the subplurality of mobile terminals being checked includes the interfering terminal. Once the interfering mobile terminal is identified, it can be commanded by the NOC to shut down or to reduce its data transmission rate (thus effectively reducing the power level of its transmitted signals) to eliminate the interference with the non-target satellite.

The above-described method can be used to check a single mobile terminal for interference within a time span of about 5–10 seconds. A transponded satellite accommodating 20–30 aircraft can be checked typically in less than 5 minutes.

BRIEF DESCRIPTION OF THE DRAWINGS

The present invention will become more fully understood from the detailed description and the accompanying drawing, wherein.

DETAILED DESCRIPTION OF THE PREFERRED EMBODIMENTS

Figure 1:
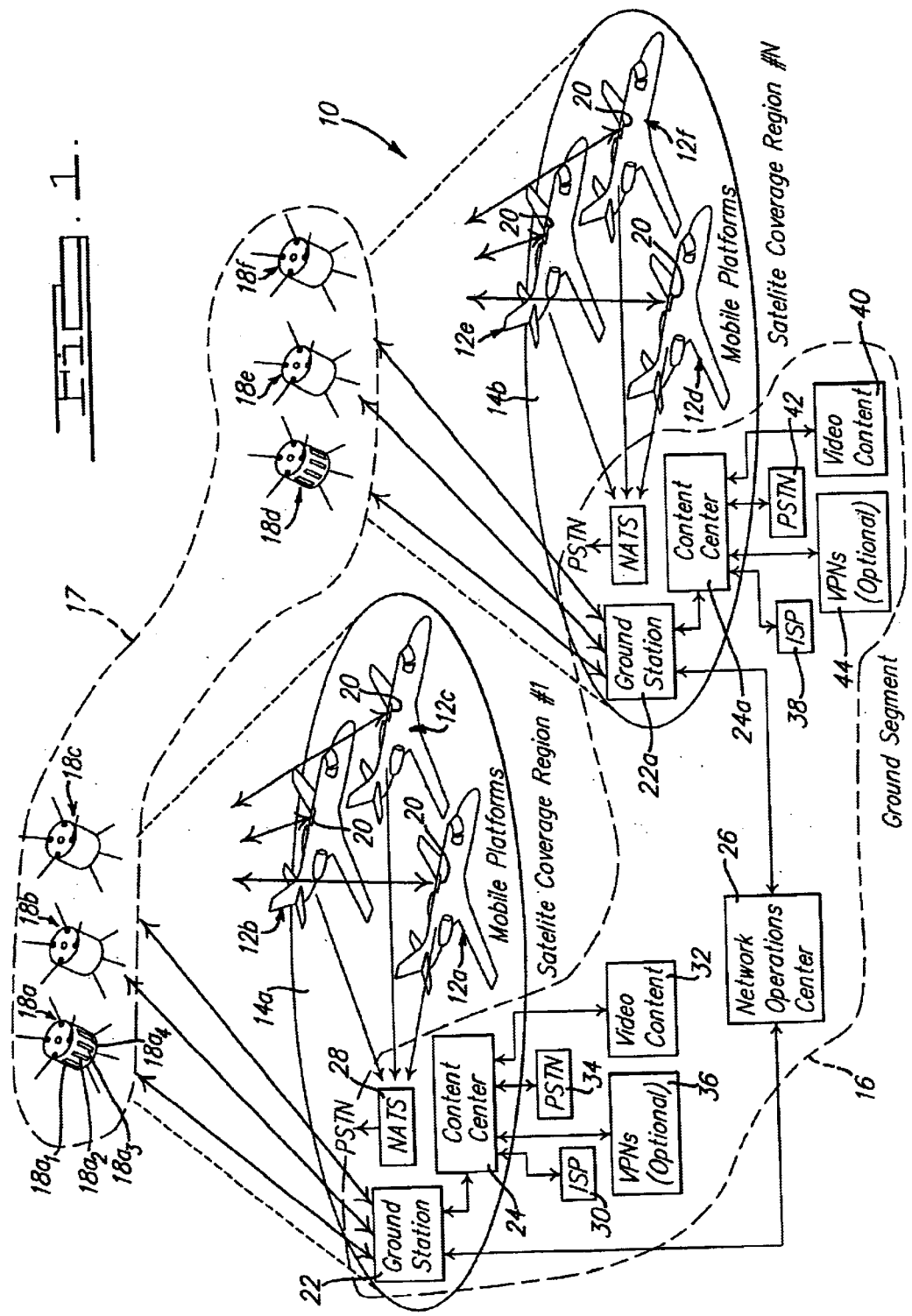
FIG. 1 is a block diagram of a communications system in which the present invention may be implemented.

Referring to FIG. 1, an exemplary system 10 is shown for use implementing the present invention. The system 10 provides data content to and from a plurality of mobile platforms 12a–12f in one or more distinct coverage regions 14a and 14b. The system 10 generally comprises a ground segment 16, a plurality of satellites 18a–18f forming a space segment 17, and a mobile terminal 20 disposed on each mobile platform 12. The mobile platforms 12 could comprise aircraft, cruise ships or any other moving vehicle. Thus, the illustration of the mobile platforms 12 as aircraft in the figures herein, and the reference to the mobile platforms as aircraft throughout the following description should not be construed as limiting the applicability of the system 10 to only aircraft.

The space segment 17 may include any number of satellites 18 in each coverage region 14a and 14b needed to provide coverage for each region. Satellites 18a, 18b, 18d and 18e are preferably Ku or Ka-band satellites. Satellites 18c and 18f are Broadcast Satellite Services (BSS) satellites. Each of the satellites 18 are further located in a geostationary orbit (GSO) or a non-geostationary orbit (NGSO). Examples of possible NGSO orbits that could be used with this invention include low Earth orbit (LEO), medium Earth orbit (MEO) and highly elliptical orbit (HEO). Each of the satellites 18 includes at least one radio frequency (RF) transponder, and more preferably a plurality of RF transponders. For example satellite 18a is illustrated having four transponders $18a_1$–$18a_4$. It will be appreciated that each other satellite 18 illustrated could have a greater or lesser plurality of RF transponders as required to handle the anticipated number of aircraft 12 operating in the coverage area. The transponders provide "bent-pipe" communications between the aircraft 12 and the ground segment 16. The frequency bands used for these communication links could comprise any radio frequency band from approximately 10 MHz to 100 GHz. The transponders preferably comprise Ku-band transponders in the frequency band designated by the Federal Communications Commission (FCC) and the International Telecommunications Union (ITU) for fixed satellite services FSS or BSS satellites. Also, different types of transponders may be employed (i.e., each satellite 18 need not include a plurality of identical types of transponders) and each transponder may operate at a different frequency. Each of the transponders $18a_1$–$18a_4$ further include wide geographic coverage, high effective isotropic radiated power (EIRP) and high gain/noise temperature (G/T).

With further reference to FIG. 1, the ground segment 16 includes a ground station 22 in bi-directional communication with a content center 24 and a network operations center (NOC) 26. A second ground station 22a located in the second coverage area 14b may be used if more than one distinct coverage area is required for the service. In this instance, ground station 22a would also be in bi-directional communication with the NOC 26 via a terrestrial ground link or any other suitable means for establishing a communication link with the NOC 26. The ground station 22a would also be in bi-directional communication with a content center 24a. For the purpose of discussion, the system 10 will be described with respect to the operations occurring in coverage region 14a. However, it will be understood that identical operations relative to the satellites 18d–18f occur in coverage region 14b. It will also be understood that the system 10 may be scaled to any number of coverage regions 14 in the manner just described.

The ground station 22 comprises an antenna and associated antenna control electronics needed for transmitting data content to the satellites 18a and 18b. The antenna of the ground station 22 may also be used to receive data content transponded by the transponders $18a_1$–$18a_4$ originating from each mobile terminal 20 of each aircraft 12 within the coverage region 14a. The ground station 22 may be located anywhere within the coverage region 14a. Similarly, ground station 22a, if incorporated, can be located anywhere within the second coverage area 14b.

The content center 24 is in communication with a variety of external data content providers and controls the transmission of video and data information received by it to the ground station 22. Preferably, the content center 24 is in contact with an Internet service provider (ISP) 30, a video content source 32 and a public switched telephone network (PSTN) 34. Optionally, the content center 24 can also communicate with one or more virtual private networks (VPNs) 36. The ISP 30 provides Internet access to each of the occupants of each aircraft 12. The video content source 32 provides live television programming, for example, Cable News Network® (CNN) and ESPN®. The NOC 26 performs traditional network management, user authentication, customer service and billing tasks. The content center 24a associated with the ground station 22a in the second coverage region 14b would also preferably be in communication with an ISP 38, a video content provider 40, a PSTN 42, and optionally a VPN 44. An optional air telephone system 28 may also be included as an alternative to the satellite return link.

Figure 2:
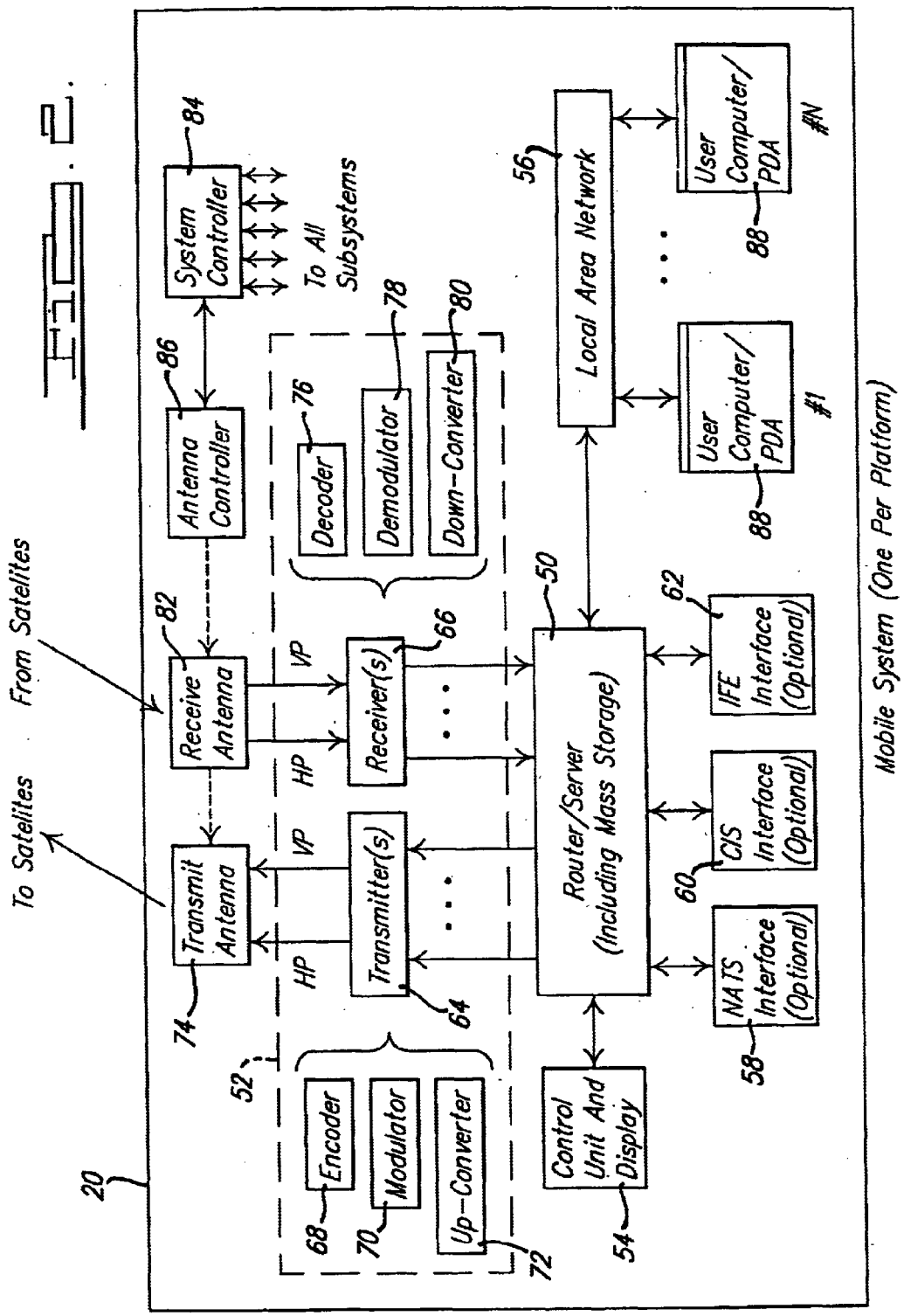
FIG. 2 is a block diagram of the mobile RF terminal disposed on each aircraft of the system shown in FIG. 1.

Referring now to FIG. 2, the mobile terminal 20 disposed on each aircraft 12 will be described in greater detail. Each mobile terminal 20 includes a data content management system in the form of a router/server 50 (hereinafter "server") which is in communication with a communications subsystem 52, a control unit and display system 54, and a distribution system in the form of a local area network (LAN) 56. Optionally, the server 50 can also be configured for operation in connection with a National Air Telephone System (NATS) 58, a crew information services system 60 and/or an in-flight entertainment system (IFE) 62.

The communications subsystem 52 includes a transmitter subsystem 64 and a receiver subsystem 66. The transmitter subsystem 64 includes an encoder 68, a modulator 70 and an Up-converter 72 for encoding, modulating and up-converting data content signals from the server 50 to a transmit antenna 74. The receiver subsystem 66 includes a decoder 76, a demodulator 78 and a down-converter 80 for decoding, demodulating and down-converting signals received by the receive antenna 82 into base band video and audio signals, as well as data signals. While only one receiver subsystem 66 is shown, it will be appreciated that preferably a plurality of receiver subsystems 66 will typically be included to enable simultaneous reception of RF signals from a plurality of RF transponders. If a plurality of receiver subsystems 66 are shown, then a corresponding plurality of components 76–80 will also be required.

The signals received by the receiver subsystem 66 are then input to the server 50. A system controller 84 is used to control all subsystems of the mobile system 20. The system controller 84, in particular, provides signals to an antenna controller 86 which is used to electronically steer the receive antenna 82 to maintain the receive antenna pointed at a particular one of the satellites 18, which will hereinafter be referred to as the "target" satellite. The transmit antenna 74 is slaved to the receive antenna 82 such that it also tracks the target satellite 18. It will be appreciated that some types of mobile antennas may transmit and receive from the same aperture. In this case the transmit antenna 74 and the receive antenna 82 are combined into a single antenna.

With further reference to FIG. 2, the local area network (LAN) 56 is used to interface the server 50 to a plurality of access stations 88 associated with each seat location on board the aircraft 12a. Each access station 88 can be used to interface the server 50 directly with a user's laptop computer, personal digital assistant (PDA) or other personal computing device of the user. The access stations 88 could also each comprise a seat back mounted computer/display. The LAN 56 enables bi-directional communication of data between the user's computing device and the server 50 such that each user is able to request a desired channel of television programming, access a desired website, access his/her email, or perform a wide variety of other tasks independently of the other users on board the aircraft 12.

The receive and transmit antennas 82 and 74, respectively, may comprise any form of steerable antenna. In one preferred form, these antennas comprise electronically scanned, phased array antennas. Phased array antennas are especially well suited for aviation applications where aerodynamic drag is important considerations. One particular form of electronically scanned, phased array antenna suitable for use with the present invention is disclosed in U.S. Pat. No. 5,886,671, assigned to The Boeing Co.

Referring further to FIG. 1, in operation of the system 10, the data content is preferably formatted into Internet protocol (IP) packets before being transmitted by either the ground station 22, or from the transmit antenna 74 of each mobile terminal 20. For the purpose of discussion, a transmission of data content in the form of IP packets from the ground station 22 will be referred to as a "forward link"

transmission. IP packet multiplexing is also preferably employed such that data content can be provided simultaneously to each of the aircraft 12 operating within the coverage region 14a using unicast, multicast and broadcast transmissions.

The IP data content packets received by each of the transponders $18a_1$–$18a_4$ are then transponded by the transponders to each aircraft 12 operating within the coverage region 14a. While multiple satellites 18 are illustrated over coverage region 14a, it will be appreciated that at the present time, a single satellite is capable of providing coverage to an area encompassing the entire continental United States. Thus, depending upon the geographic size of the coverage region and the mobile platform traffic anticipated within the region, it is possible that only a single satellite incorporating a single transponder may be needed to provide coverage for the entire region. Other distinct coverage regions besides the continental United States include Europe, South/Central America, East Asia, Middle East, North Atlantic, etc. It is anticipated that in service regions larger than the continental United States, that a plurality of satellites 18 each incorporating one or more transponders may be required to provide complete coverage of the region.

The receive antenna 82 and transmit antenna 74 are each preferably disposed on the top of the fuselage of their associated aircraft 12. The receive antenna 74 of each aircraft receives the entire RF transmission of encoded RF signals representing the IP data content packets from at least one of the transponders $18a_1$–$18a_4$. The receive antenna 82 receives horizontally polarized (HP) and vertically polarized (VP) signals which are input to at least one of the receivers 66. If more than one receiver 66 is incorporated, then one will be designated for use with a particular transponder $18a_1$–$18a_4$ carried by the target satellite 18 to which it is pointed. The receiver 66 decodes, demodulates and downconverts the encoded RF signals to produce video and audio signals, as well as data signals, that are input to the server 50. The server 50 operates to filter off and discard any data content not intended for users on the aircraft 12a and then forwards the remaining data content via the LAN 56 to the appropriate access stations 88.

Referring further to FIG. 1, a transmission of data content from the aircraft 12a to the ground station 22 will be described. This transmission is termed a "return link" transmission. The antenna controller 86 causes the transmit antenna 74 to maintain the antenna beam thereof pointed at the target satellite 18a. The channels used for communication from each mobile terminal 20 back to the ground station 22 represent point-to-point links that are individually assigned and dynamically managed by the NOC 26 of the ground segment 16. For the system 10 to accommodate several hundred or more aircraft 12, multiple aircraft need to be assigned to each transponder carried by a given satellite 18. The preferred multiple access methods for the return link are code division multiple access (CDMA), frequency divisional multiple access (FDMA), time division multiple access (TDMA) or combinations thereof. Thus, multiple mobile terminals 20 may be assigned to a single transponder $18a_1$–$18a_4$. Where a greater number of aircraft 12 incorporating a mobile terminal 20 are operated within the coverage region 14a, then the number of transponders required increases accordingly.

The receive antenna 82 may implement a closed-loop tracking system for pointing the antenna beam and for adjusting the polarization of the antennas based on receive signal amplitude. The transmit antenna 74 is slaved to the point direction and polarization of the receive antenna 82.

An alternative implementation could use an open-loop tracking method with the pointing direction and polarization determined by knowledge of the aircraft's 12 position and attitude using an on-board inertial reference unit (IRU) and knowledge of the location of the satellites 18.

Encoded RF signals are transmitted from the transmit antenna 74 of the mobile terminal 20 of a given aircraft 12 to an assigned one of the transponders $18a_1$–$18a_4$, and transponded by the designated transponder to the ground station 22. The ground station 22 communicates with the content center 24 to determine and provide the appropriate data being requested by the user (e.g., content from the world wide web, email or information from the user's VPN).

An additional concern that must be taken into account with the system 10 is the potential for interference that may result from the small aperture size of the receive antenna 82. The aperture size of the receive antenna 82 is typically smaller than conventional "very small aperture terminal" (VSAT) antennas. Accordingly, the beam from the receive antenna 82 may encompass adjacent satellites along the geosynchronous arc. This can result in the mobile terminal 20 receiving a signal from a satellite other than the target satellite. To overcome this potential problem, the system 10 preferably uses a lower than normal forward link data rate that overcomes the interference from adjacent satellites. For example, the system 10 operates at a preferred forward link data rate of at least about 5 Mbps per transponder, using a typical FSS Ku-band transponder (e.g., Telstar-6) and an antenna having an active aperture of about 17 inches by 24 inches (43.18 cm by 60.96 cm). For comparison purposes, a typical Ku-band transponder usually operates at a data rate of approximately 30 Mbps using conventional VSAT antennas.

Using a standard digital video broadcast (DVB) waveform, the forward link signal typically occupies less than 8 MHz out of a total transponder width of 27 MHz. However, concentrating the transponder power in less than the full transponder bandwidth could create a regulatory concern. FCC regulations presently regulate the maximum effective isotropic radiated power (EIRP) spectral density from a transponder to prevent interference between closely spaced satellites. Accordingly, in one preferred embodiment of the system 10, spread spectrum modulation techniques are employed in modulator 70 to "spread" the forward link signal over the transponder bandwidth using well known signal spreading techniques. This reduces the spectral density of the transponded signal, thus eliminating the possibility of interference between two or more mobile terminals 20.

It is also equally important that the transmit antenna 74 meets regulatory requirements that prevent interference to satellites adjacent to the target satellite 18. The transmit antennas used in most mobile applications also tend to be smaller than conventional VSAT antennas (typically reflector antennas that are 1 meter in diameter). Mobile transmit antennas used for aeronautical applications should have low aerodynamic drag, be lightweight, have low power consumption and be of relatively small size. For all these reasons, the antenna aperture of the transmit antenna 74 is preferably smaller than a conventional VSAT antenna. VSAT antennas are sized to create an antenna beam that is narrow enough to illuminate a single FSS satellite along the geosynchronous arc. This is important because FSS satellites are spaced at 2° intervals along the geosynchronous arc. The smaller than normal antenna aperture of the transmit antenna 74 used with the present invention, in some instances, may create an antenna beam that is wide enough to irradiate satellites that are adjacent to the target satellite along the geosynchronous arc, which could create an interference problem. The likelihood of this potential problem arising is reduced by employing spread spectrum modulation techniques on the return link transmissions as well. The transmitted signal from the transmit antenna 74 is spread in frequency to produce an interfering signal at the adjacent satellite that is below the threshold EIRP spectral density at which the signal would interfere. It will be appreciated, however, that spread spectrum modulation techniques may not be required if the angular spacing between satellites within a given coverage region is such that interference will not be a problem.

Figure 3:
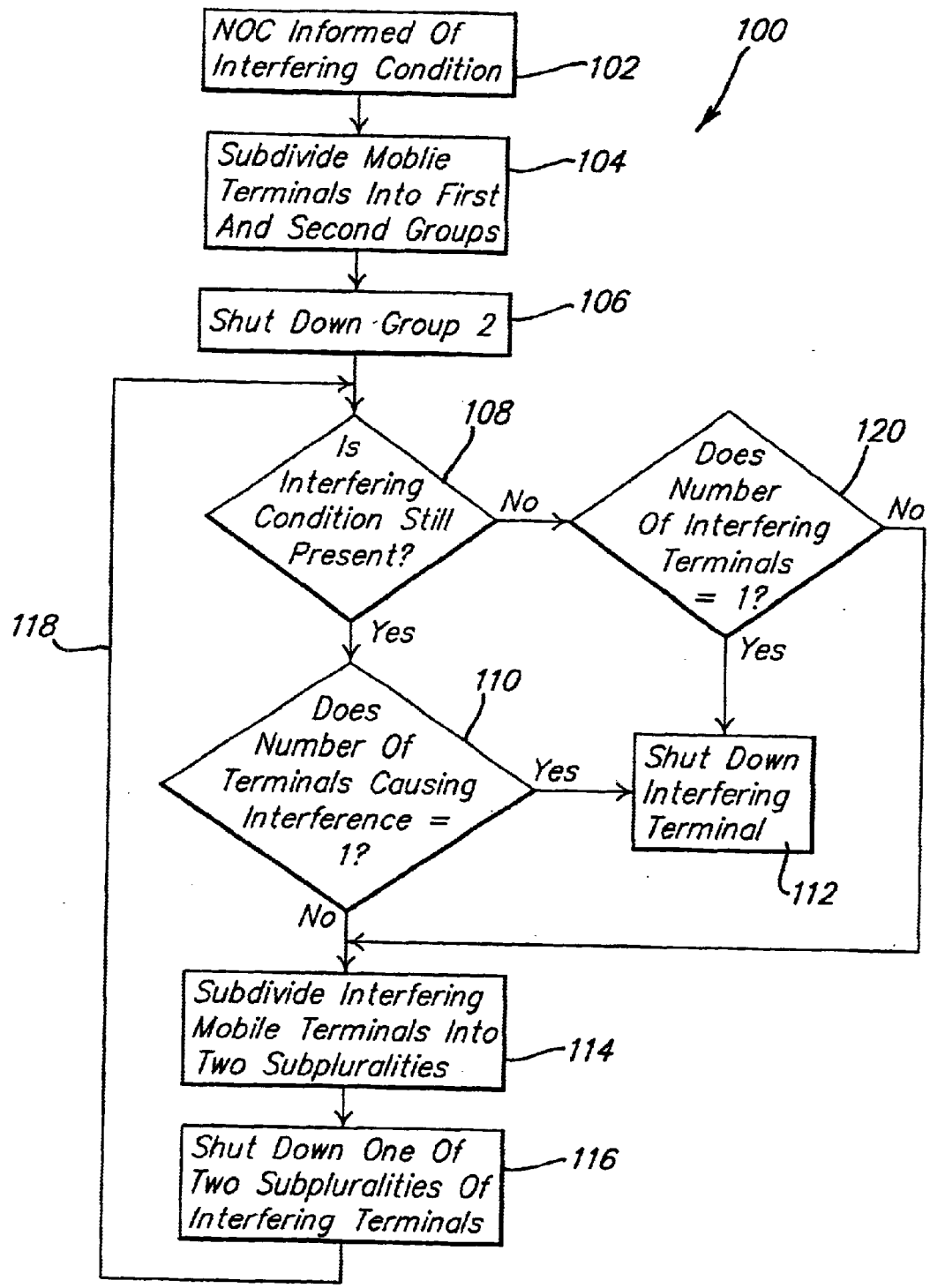
FIG. 3 is a flowchart illustrating the binary search scheme of the present invention used to determine which one of a plurality of mobile RF terminals is causing interference with a non-target satellite.

Referring to FIG. 3, there is shown a flowchart illustrating the steps performed by the method 100 of the present invention in determining which one of a plurality of mobile RF terminals is causing an interfering condition with a non-target satellite. The invention makes use of the NOC 26 to monitor all communications by the mobile terminals 20 with the target satellite, which in this discussion will be satellite 18b of FIG. 1. The NOC 26 also controls the transmit power levels of all mobile terminals 20. A suitable power control system is disclosed in U.S. application Ser. No. 09/728,605, filed Dec. 1, 2000, and hereby incorporated by reference into the present application.

In FIG. 3, the NOC 26 is informed of an interfering condition from the operator of the non-target satellite, which will typically be a Fixed Services Satellite (FSS), as indicated at step 102. In this example, the interfered with, non-target satellite could be either of satellites 18a or 18c. The NOC 26 first divides all of the mobile terminals 20 accessing the target satellite 18b into two groups (groups 1 and 2), and preferably into two equal groups, if the total number permits such a division, as indicated at step 104.

The NOC 26 then commands all of the mobile terminals 20 in one group, for example group 2, to stop transmitting momentarily, as indicated at step 106. The NOC 26 then checks with the operator of the interfered with FSS satellite to determine if the interfering condition is still present, as indicated at step 108. If so, the NOC 26 then checks to see if the subplurality of mobile terminals 20 comprising group 1 is equal to one, as indicated at step 110. If so, then NOC 26 has identified the specific mobile terminal 20 causing the interference, and the NOC 26 then commands that specific mobile terminal to either stop transmitting or to reduce its power level to an extent sufficient to eliminate the interference, as indicated at step 112.

If the check at step 110 determines that group 1 of the mobile terminals 20 is not equal to only one mobile terminal, then the NOC 26 further subdivides group 1 into two smaller subpluralities (e.g., 3 and 4), as indicated at step 114.

The NOC 26 then commands one of the two subpluralities 3 and 4 of mobile terminals 20, for example subplurality 4, to also shut down momentarily, as indicated at step 116. The NOC 26 then checks with the FSS operator again to determine if the interference is still present, as indicated by line 118. If so, steps 108–116 are repeated using successively smaller and smaller subpluralities of mobile terminals 20 which are commanded by the NOC 26 to stop transmitting, each subplurality being divided preferably by two, until the NOC identifies a single mobile terminal that is causing the interference.

If the initial check at step 108 indicates that the interfering condition has been eliminated (i.e., that shutting down the group 2 terminals eliminated the interfering condition), then the NOC 26 determines that the first group (i.e., half) of mobile terminals 20 is not causing the interfering condition, and that group 2 includes the interfering terminal. Another check is made at step 120 to determine if the number of mobile terminals 20 in group 2 is equal to one. If so, the NOC 26 has identified the interfering mobile terminal 20 and it then commands that terminal to shut down or reduce its transmit power level, as indicated at step 112. If not, steps 114, 116 and 108 are repeated until the specific interfering terminal 20 has been identified.

By sequentially shutting down smaller and smaller subpluralities of mobile terminals 20, an interfering mobile terminal can be quickly identified by the NOC 26. Using the above-described process, an entire transponded satellite accommodating up to about 30 aircraft can be rapidly checked in less than about 5 minutes.

Those skilled in the art can now appreciate from the foregoing description that the broad teachings of the present invention can be implemented in a variety of forms. It will also be appreciated that the variations of the preferred embodiments in specific embodiments herein could readily be implemented in other ones of the embodiments. Therefore, while this invention has been described in connection with particular examples thereof, the true scope of the invention should not be so limited since other modifications will become apparent to the skilled practitioner upon a study of the drawings, specification and following claims.

What is claimed is:

1. A method for rapidly identifying which one of a plurality of radio frequency (RF) terminals in communication with a target RF device is causing RF interference with one or more non-target RF devices located in physical proximity to the target RF device, the method comprising the steps of:
   a) using a monitoring component to monitor transmissions from said RF terminals to said target RF device;
   b) having an operator associated with said non-target RF device experiencing RF interference inform said monitoring component of the existence of said RF interference;
   c) using said monitoring component to divide all of said RF terminals into at least first and second groups;
   d) using said monitoring component to command at least one of said groups to cease transmitting operations;
   e) using said monitoring component to identify an interfering group that is causing said RF interference;
   f) from said interfering group that is causing said RF interference, if more than one said RF terminal is present in said interfering group, then further subdividing said interfering group into at least a pair of further groups; and
   g) repeating steps d) through f) until a specific interfering RF terminal is identified.

2. The method of claim 1, further comprising the step of using said monitoring component to command said specific interfering terminal to cease transmitting operations.

3. The method of claim 1, wherein the step of using a monitoring component comprises using a ground-based network operations center (NOC).

4. The method of claim 1, wherein step c) comprises dividing all of said RF terminals into only two groups.

5. A method for rapidly determining which one of a plurality of mobile RF terminals accessing a target RF device, and operating within a given coverage region, is causing interference with a non-target RF device disposed in proximity to said target device, said method comprising the steps of:

having an operator of said non-target RF device experiencing RF interference inform a monitoring component that an interference condition has arisen;

using said monitoring component to divide all of said RF terminals into first and second groups;

using said monitoring component to order each of said RF terminals in said first group, to cease transmitting operations;

determining if said interference is eliminated;

if said interference is eliminated, then further subdividing said first group into third and fourth groups;

further using said monitoring component to again command one of said third and fourth groups of said RF devices to cease transmitting;

checking to determine if said interference condition has abated; and continuing to alternately sub-divide by two and check each group of said RF terminals for said interference condition until a specific one of said RF terminals is identified which is causing said interference condition.

6. A method for quickly determining which one of a plurality of mobile RF terminals accessing a transponded target satellite is causing interference with a non-target satellite in the vicinity of said target satellite, said method comprising the steps of:

using a ground station having a network operations center (NOC) to monitor all transmissions between said mobile terminals and said ground station;

having an operator inform said NOC when an interference condition arises with said non-target satellite;

using the NOC to divide said mobile terminals into first and second groups;

using the NOC to command all of said mobile terminals within said second group to shut down transmitting operations;

using the NOC to determine, in connection with information supplied by said operator, if said interference condition still exists;

if said interference condition still exists, using said NOC to further subdivide said first group into 3rd and 4th groups of mobile terminals;

using said NOC to command said 4th group of mobile terminals to shut down;

using said NOC to determine if said interference condition is still present; and using said NOC to repeatedly subdivide that subplurality of said mobile terminals which is causing said interference condition until said NOC has identified a single one of said mobile terminals that is causing said interference condition.

* * * * *